United States Patent
Deng et al.

(10) Patent No.: US 12,210,568 B2
(45) Date of Patent: **\*Jan. 28, 2025**

(54) METHODS AND SYSTEMS FOR DYNAMICALLY SELECTING AND PROVIDING WEB RESOURCES

(71) Applicant: Shopify Inc., Ottawa (CA)

(72) Inventors: Jeffrey Zi Tao Deng, Markham (CA); Yuriy Savenko, East Gwillimbury (CA); Nicholas Andrew Montgomery, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,828

(22) Filed: Nov. 6, 2023

(65) Prior Publication Data

US 2024/0070196 A1    Feb. 29, 2024

Related U.S. Application Data

(63) Continuation of application No. 17/879,478, filed on Aug. 2, 2022, now Pat. No. 11,847,162, which is a continuation of application No. 17/094,310, filed on Nov. 10, 2020, now Pat. No. 11,442,984.

(51) Int. Cl.
*G06F 16/735* (2019.01)
*G06F 16/738* (2019.01)
*G06Q 10/0633* (2023.01)
*G06Q 10/067* (2023.01)

(52) U.S. Cl.
CPC ......... *G06F 16/735* (2019.01); *G06F 16/739* (2019.01); *G06Q 10/0633* (2013.01); *G06Q 10/067* (2013.01)

(58) Field of Classification Search
CPC .... G06F 16/735; G06F 16/739; G06F 16/955; G06Q 10/0633; G06Q 10/067; G06Q 30/0282; G06Q 30/04; G06Q 30/06; H04N 21/4668; H04N 21/47815
See application file for complete search history.

(56) References Cited

U.S. PATENT DOCUMENTS

| | | | | |
|---|---|---|---|---|
| 8,620,767 | B2 * | 12/2013 | Linden | G06Q 30/0253 705/26.1 |
| 9,390,447 | B1 * | 7/2016 | Smith | H04N 21/44016 |
| 9,639,634 | B1 * | 5/2017 | Greene | H04N 21/4532 |
| 2010/0199295 | A1 * | 8/2010 | Katpelly | G06N 5/04 725/46 |
| 2012/0304223 | A1 * | 11/2012 | Sargent | H04N 21/44016 725/32 |
| 2016/0019627 | A1 * | 1/2016 | Musil | H04N 21/6582 705/26.7 |

(Continued)

Primary Examiner — Jared M Bibbee
(74) Attorney, Agent, or Firm — Smart & Biggar LP

(57) ABSTRACT

Methods and systems for selecting and presenting web resources (e.g. videos) are provided, the method includes: transmitting a first video to be played by a device associated with a user account; and during playback of the first video at the device: detecting an update to configuration data associated with the user account; determining, based on the update to the configuration data associated with the user account, a next video recommendation for the user account; and causing an indication of the next video recommendation to be displayed on the device.

20 Claims, 10 Drawing Sheets

(56) References Cited

U.S. PATENT DOCUMENTS

| | | | | |
|---|---|---|---|---|
| 2016/0066040 | A1* | 3/2016 | Webster | H04N 21/44222 |
| | | | | 725/34 |
| 2016/0337702 | A1* | 11/2016 | Klappert | H04N 21/4316 |
| 2018/0146229 | A1* | 5/2018 | Wilms | H04N 21/26258 |
| 2018/0278988 | A1* | 9/2018 | Goldeen | H04L 65/612 |
| 2019/0205971 | A1* | 7/2019 | Deo | H04L 67/535 |
| 2020/0403954 | A1* | 12/2020 | Perry | G06Q 50/01 |
| 2022/0076308 | A1* | 3/2022 | Zacharias | G06Q 30/0639 |

* cited by examiner

E-Commerce Platform

Search (652)

- Home
- Orders
- Products
- Customers
- Reports
- Discounts
- Apps

SALES CHANNELS ⊕
- Online Store
- Mobile App
- View all channels ⌀

Settings

JG John's Apparel / Jonny B. Good

Good afternoon, Jonny B.

Here's what's happening with your store today.

Today's total sales   Today's visits
$98.00                1

○ Update your Platform Payments tax details
  We require additional information to verify your identity.
  [Update tax details]

○ Advanced Cash on Delivery has been deactivated for your store
  [See why]

All channels ˅    Today ˃

TOTAL SALES    Jun 1
$98.00         2 orders
$125
$75
$25
12am  4am  8am  11am

TOTAL SALES BY CHANNEL    June 1    View dashboard

Online Store
$0.00         0 orders

Mobile App
$0.00         0 orders

POS
$0.00         0 orders

FIG. 6

METHODS AND SYSTEMS FOR DYNAMICALLY SELECTING AND PROVIDING WEB RESOURCES

CROSS-REFERENCE TO RELATED APPLICATIONS

This application is a continuation of U.S. patent application Ser. No. 17/879,478, filed Aug. 2, 2022, entitled "METHODS AND SYSTEMS FOR DYNAMICALLY SELECTING AND PROVIDING WEB RESOURCES"; which is a continuation of U.S. patent application Ser. No. 17/094,310, filed Nov. 10, 2020, entitled "METHODS AND SYSTEMS FOR DYNAMICALLY SELECTING AND PROVIDING WEB RESOURCES"; the contents of which are all hereby expressly incorporated into the present application by reference in their entireties.

FIELD

The present disclosure is related to providing web resources in a dynamic manner. In particular, the present disclosure relates to methods and systems for dynamically selecting and providing one or more web resources based on one or more settings or configurations associated with a user account.

BACKGROUND

When a platform or system is configured to provide users with one or more resources (e.g., videos) in sequence or in some order over a network such as the internet (the "web resources"), many of the web resources available to a user area pre-arranged and presented in accordance with criteria, such as, for example, the user's experience level (e.g., new user account), or the user's indicated interests (e.g., interested in learning about machine learning).

However, the pre-arranged web resources may not be customized enough for each individual user when faced with a large number of users with varying degrees of experiences or needs.

SUMMARY

In various examples, the present disclosure describes various methods and systems to dynamically determine a next web resource (e.g. a video or a text file) to be provided to a user based on one or more configuration data associated with a user account or associated with a website associated with a user account, which may include configuration and operation data of one or more online stores associated with a user account. The configuration data may include data generated as a result of one or more user actions, such as changes to user settings. Updates to the configuration data may be detected or retrieved in real time or near real time. The next web resource may be determined while the user is viewing or consuming the first web resource, and an indication (e.g. a web link) for the next web resource may be displayed within, or superimposed on top of the first web resource, such that the user may click on and proceed to view the next web resource before finishing the first web resource.

Notably, by using real time data (e.g. configuration data) from a website associated with a user account, the system may infer the user's knowledge level in a topic, and determine a suitable web resource based on the inferred knowledge level. In this way, web resources may be selected based on the inferred knowledge level of a user. The system may present the indication of the next recommended web resource in real time, so that the user may proceed to consume the next web resource on his own timing.

In some examples, the present disclosure describes a method for selecting and presenting web resources (e.g. videos) are provided, the method may include: transmitting a first video to be played by a device associated with a user account, and during playback of the first video at the device: detecting an update to configuration data associated with the user account, determining, based on the update to the configuration data associated with the user account, a next video recommendation for the user account, and causing an indication of the next video recommendation to be displayed on the device.

In some of the examples, the user account may be a merchant user account associated with an online store hosted by an e-commerce system, the configuration data associated with the user account may include configuration and operation data associated with the online store, and the method may further include: prior to transmitting the first video, receiving an initial set of configuration and operation data associated with the online store; and determining the first video to be transmitted based on the initial set of configuration and operation data associated with the online store, the first video being related to the online store.

In some of the examples, the user account may be a merchant user account associated with an online store hosted by an e-commerce system, and the configuration data associated with the user account may include data on store performance, e.g. such as sales or user traffic.

In some of the examples, the method may further include: determining a first list of videos to be played for the merchant user account based on the initial set of configuration and operation data associated with the online store, the first list of videos commencing with the first video; and in response to determining the next video recommendation, dynamically updating the first list of videos for the merchant user account in real time or near real time based on the next video recommendation.

In some of the examples, dynamically updating the first list of videos may include at least one of: removing one or more videos from the first list of videos based on the update to the configuration and operation data associated with the online store; and changing an order of the videos to be played based on the update to the configuration and operation data associated with the online store.

In some of the examples, the initial set of configuration and operation data associated with the online store may include at least one of: a product listing configuration, a marketing campaign configuration, a payment configuration associated with the merchant user account, a sales event associated with the online store, a user account setting associated with the merchant user account, an order fulfilment event associated with the online store, a shipping event associated with the online store, or a display configuration associated of the online store.

In some of the examples, the update to the configuration data associated with the user account may include an update to the configuration and operation data associated with the online store, which may include at least one of: a product listing add event, a marketing campaign run event, a payment configuration add event, a sales event associated with the online store, a user account setting update associated with the merchant user account, an order fulfilment event, a shipping event, or a modification event associated with a display configuration of the online store.

In some of the examples, the method may include: prior to detecting the update to the configuration data, causing a message to be displayed on the device, the message requesting a user action to be performed and including a link to perform the user action, the update to the configuration data comprises a confirmation that the requested user action has been performed.

In some of the examples, the user account may be a merchant user account associated with an online store, the configuration data associated with the user account may include configuration and operation data associated with the online store, and the user action may include at least one of: adding or updating product information associated with the online store; adding or updating user account information; adding or updating payment information associated with the online store; and adding or updating the configuration and operation data associated with the online store.

In some of the examples, the indication of the next video recommendation may be a link to the next video, and the link may be displayed during the playback of the first video.

In some of the examples, the link to the next video may be automatically generated in real time or near real time based on the configuration data.

In some examples, the present disclosure describes a system including a processor in communication with storage. The processor is configured to execute instructions from the storage to cause the system to: transmit a first video to be played by a device associated with a user account, and during playback of the first video at the device: detect an update to configuration data associated with the user account; determine, based on the update to the configuration data associated with the user account, a next video recommendation for the user account; and cause an indication of the next video recommendation to be displayed on the device.

The processor may be configured to execute instructions to cause the system to perform any of the methods described herein.

In some examples, the present disclosure describes a computer-readable medium storing instructions that, when executed by a processor of a system, cause the system to: transmit a first video to be played by a device associated with a user account, and during playback of the first video at the device: detect an update to configuration data associated with the user account; determine, based on the update to the configuration data associated with the user account, a next video recommendation for the user account; and cause an indication of the next video recommendation to be displayed on the device.

The instructions, when executed by the processor, may cause the system to perform any of the methods described herein.

BRIEF DESCRIPTION OF THE DRAWINGS

Reference will now be made, by way of example, to the accompanying drawings which show example embodiments of the present application, and in which:

FIG. 6 is an example homepage of an administrator, which may be accessed via the e-commerce platform of FIG. 5;

Similar reference numerals may have been used in different figures to denote similar components.

DESCRIPTION OF EXAMPLE EMBODIMENTS

As mentioned, a platform or system may be configured to provide users with one or more resources (e.g., videos) in sequence or in some order over a network such as the internet (the "web resources"), many of the web resources available to a user area pre-arranged and presented in accordance with criteria, such as, for example, the user's experience level (e.g., new user account), or the user's indicated interests (e.g., interested in learning about machine learning).

In cases such as where, for example, web resources presented to a user relate to a particular topic (e.g., with educational resources), a pre-arranged ordering of web resources may fail to cater to the user's growth and in particular, may fail to provide better materials once a user has accumulated enough knowledge regarding a certain topic. Sometimes, when the pre-arranged web resources are educational materials, the materials may be inaccurate or misleading based on a specific user's needs or goals.

For example, when an e-commerce platform provides a lesson plan for individual users (e.g., for new users setting up an online store), web resources such as articles, help pages, blogs, audios, or videos may be part of the lesson plan. However, these web resources tend to be pre-arranged in a certain order or sequence, and are typically static—e.g., a selection of videos cannot be tailored in real time to suit a user's particular needs or store settings, once the videos have started playing.

In the context of an e-commerce platform, in some cases, when a user first sets up an online store on an e-commerce platform, an initial set of web resources, such as a sequence of videos, may be generated based on a set of configuration data of the online store, which may include user settings of that particular user. However, the sequence of videos is typically presented and consumed as a video playlist, which requires the user to return to the video playlist before he or she is able to access the next video. Notably, once the playlist is populated, the order and contents thereof are often fixed in the system.

As a user consumes some of the provided web resources and develops certain knowledge regarding a subject matter, he or she may wish to have a more personalized learning plan that can adapt to his or her needs and knowledge base.

The present disclosure will be described in the context of an example general software system platform, then in the context of an example e-commerce platform, discussed below. However, it should be understood that this discussion is only for the purpose of illustration and is not intended to be limiting. Further, it should be understood that the present disclosure may be implemented in other contexts, and is not necessarily limited to implementation in an e-commerce platform.

Figure 1:
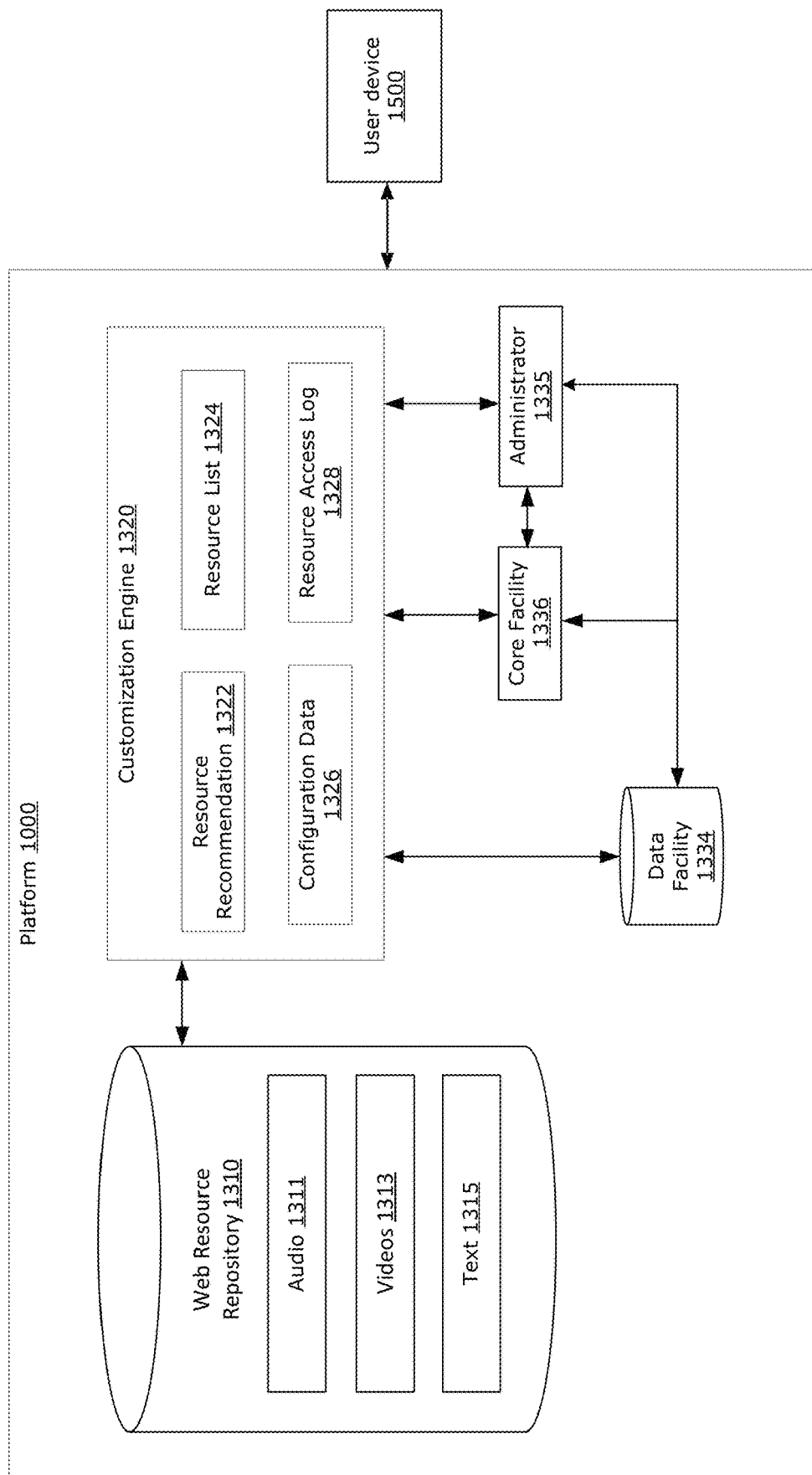
FIG. 1 is a block diagram of an example platform in which examples described herein may be implemented.

FIG. 1 shows a block diagram of an example platform 1000 in which examples described herein may be implemented. In particular, FIG. 1 illustrates some example platform 1000 having a database 1310 storing one or more web resources, a customization engine 1320, a core facility module 1336, an administrator facility 1335, and a data facility 1334. The platform 1000 may be connected to one or more user devices 1500 over a network.

The customization engine 1320 may be implemented to generate one or more recommendations for web resources 1322 based on a set of configuration data 1326 that is obtained in real time or near real time from the data facility 1334, the core facility 1336 and/or the administrator facility 1335. The one or more recommended web resources 1322 may include resources for a plurality of user accounts, and each user account may be associated with a respective resource list 1324. A resource list 1324 includes a list of web resources recommended for the particular user account, and may be an ordered list. For example, a resource list 1324 may include a list of video files to be consumed by a user associated with a user account in a pre-arranged order; in this case, a preceding video may need to be streamed in full prior to the subsequent video being available for streaming.

The database 1310 storing one or more web resources may be known as a web resource repository 1310 (the "repository 1310"). The repository 1310 may be a stand-alone database, or may be part of data facility 1334. The repository 1310 may store one or more types of web resources, which may include, for example, audio files 1311, video files 1313, text files 1315, and other types of resource files, such as for example images, HTML files, various types of documents, and so on. Each of these web resources may be associated with a set of access criteria, which need to be satisfied prior to granting a user access to the web resource. The access criteria may include, for example, one or more of: a user level, a prerequisite requirement, a payment requirement, a user account or website configuration requirement, a geographical limitation, and any other suitable access requirement(s).

A user level may be indicated by a user account setting, such as a new user being indicated by an account creation date and/or time. A prerequisite requirement may indicate if any prior web resource has to be consumed prior to the present web resource being consumed. A payment requirement may indicate if any payment is required prior to the present web resource being consumed. A user account or website configuration requirement may indicate one or more configurations that need to be set in the configuration data prior to the present web resource being consumed. A geographical limitation may indicate that the location of the user (e.g., as indicated by an IP address of the user device 1500) needs to be within a certain country or region prior to the present web resource being consumed. The set of access criteria may be pre-determined (e.g., when the web resource is first created and stored in the repository 1310) and modified when appropriate.

A web resource may be consumed in a number of ways. For example, for an audio file 1311 or a video file 1313, the file may be downloaded or streamed by the user device 1500. For another example, for a text file 1315, the file may be downloaded or displayed by the user device 1500. It may be assumed that when the web resource has been consumed by the user device 1500 (e.g., the entirety of an audio file 1311 or video file 1313 has been downloaded or streamed, or the entirety of a text file 1315 has been downloaded or displayed), the user account associated with the user device 1500 has consumed the web resource. Each time a web resource has been consumed by the user device 1500, an indication may be made by the customization engine 1320 to indicate that the file has been consumed by a particular user account associated with the user device 1500. For example, the customization engine 1320 may generate, store and modify a resource access log 1328 for each user account, the resource access log 1328 containing a list of web resources 1311, 1313, 1315 that have been accessed by the respective user account, along with a number of optional data fields such as access time, IP address, user device ID, and so on. The resource access log 1328 may also be saved on the repository 1310 or the data facility 1334.

In some embodiments, the customization engine 1320 may be configured to receive or retrieve one or more configuration data 1326 associated with a user account. For example, the configuration data 1326 may be configuration data 1326 associated with a user account, such as configuration data 1326 obtained from a website that is associated with the user account. The website may be a website implemented by the core facility 1336, and may have an administrator facility 1335. The configuration data 1326 of the website may be stored in the data facility 1334. In some embodiments, the website may be a user profile website, and the configuration data may include, without limitation, for example, user ID, e-mail address, name, address, gender, hobbies, birthday, annual income, any linked social media account(s), payment information, employment information and so on.

In some embodiments, the website may be an online store, the user may be a merchant user of an e-commerce platform, and the configuration data 1326 may include both configuration data and operation data of the online store, for example, including one or more of: a product listing configuration, a marketing campaign configuration, a payment configuration associated with the merchant user account, a sales event associated with the online store, a user account setting associated with the merchant user account, an order fulfilment event associated with the online store, a shipping event associated with the online store, or a display configuration (e.g. a visual theme or property) associated of the online store.

In some embodiments, when the website is an online store, the user is a merchant user of an e-commerce platform, and when the merchant user has provided consent to the e-commerce platform, the configuration data 1326 may include data from more than one store, such as from all stores that are associated with the merchant user. Any user action that has been taken in association with any of the associated stores may be used to customize web resource content for the merchant user.

In some embodiments, the core facility 1336 may be implemented for content management and task automation to enable support and services to one or more user devices 1500 (e.g., related to users, reports, financials, risk and fraud, and the like). The administrator facility 1335 may provide a user with access to one or more configuration settings of the user account, such as a website (associated with the user account) that is implemented by the core facility 1336. The user may edit the configuration settings of the website through the administrator facility 1336 using the user device 1500, and any configuration data generated or updated by the user using the user device 1500 (or using a different device) may be stored in the data facility 1334 in real time or near real time. The customization engine 1320 may be configured to query the core facility 1336, the administrator facility 1335 and/or the data facility 1334 to obtain the one or more configuration data 1326 regarding the website associated with the user account. In particular, updates or changes to the configuration data 1326 may be obtained in real time or near real time by the customization engine 1320.

Once the customization engine 1320 has obtained an initial set of configuration data 1326 associated with a user account, such as configuration data 1326 related to a website associated with the user account, the customization engine 1320 may determine a first web resource to be sent to the user device 1500, based on the initial set of configuration data 1326. For example, the initial set of configuration data 1326 may indicate that the user account is a new user account, and the user is interested in learning about how to set up payment information in his profile.

In some examples, the configuration data 1326 associated with the user account may include data on store performance, e.g. such as sales or user traffic. The customization engine 1320 may, based on the initial set of configuration data 1326, determine that the first recommended web resource 1322 should be a video that teaches a user how to navigate an administrator interface to add payment information. The customization engine 1320 may further determine that, as an optional step, a second recommended web resource 1322 should be a document in PDF format with detailed examples of various payment methods that may be used for the website associated with the user account. The first web resource and the second web resources 1322 may form a resource list 1324. The customization engine 1320 may send the first web resource to the user device 1500 for consumption, and once a signal is received indicating that the first web resource has been downloaded or streamed in full, the customization engine 1320 may send the second web resource to the user device 1500 for download or viewing. Alternatively, the customization engine 1320 may present the both the first and second web resources 1322 in the resource list 1324 at the same time to the user device 1500, in which case both the first and second web resources 1322 may be available for download or browsing by the user device 1500 without any particular order.

When the first web resource happens to be a video file, the customization engine 1320 may be implemented to transmit the first video to the user device 1500 for playback, and during the playback of the first video at the user device 1500, the customization engine 1320 may monitor the configuration data 1326 associated with the user account, and detect an update to the configuration data 1326. The customization engine 1320 may then determine, based on the update to the configuration data 1326, a next web resource (e.g. a second video) recommendation 1322 for the user, and may further send an indication of the next web resource recommendation to the user device 1500. The indication of the next web resource may be, as an example, a web link to the web resource.

An update to the configuration data 1326 may include a modification to existing configuration data 1326 from the initial set of configuration data, or a new type of configuration data that has not been previously included in the initial set of configuration data 1326. For example, if the customization engine 1320 detects that the user has changed his or her address from Canada to the United States, the customization engine 1320 may recommend a web resource (e.g., a video file) regarding how to add a U.S. bank account to the user profile to be added to the resource list 1324 for presentation to the user device 1500.

For another example, if the customization engine 1320 detects that the user has signed up for a loyalty club membership, the customization engine 1320 may recommend a web resource (e.g., an audio file) regarding how to best make use of the loyalty club membership to be added to the resource list 1324 for presentation to the user device 1500.

For yet another example, the customization engine 1320 may detect that the user has participated in or completed a certain level of educational content (e.g. finished a subset of a learning content), and the customization engine 1320 may recommend a web resource based on how much the user has already consumed in terms of educational content on a given topic.

As mentioned above, each web resource may be associated with a set of access criteria. A web resource may be recommended for a user account if all the required criteria can be satisfied, for example, if all the criteria can be found in the configuration data 1326 associated with the user account. If multiple web resources are found to be recommendable based on the configuration data 1326, a consumption or recommendation sequence may be determined. For instance, multiple web resources may be arranged in a random order in the resource list 1324, or ordered based on a pre-determined setting (e.g. a default or priority order). In some cases, the customization engine 1320 may group related web resources together in the resource list 1324, for example, by similar topic or subject matter.

Figure 2:
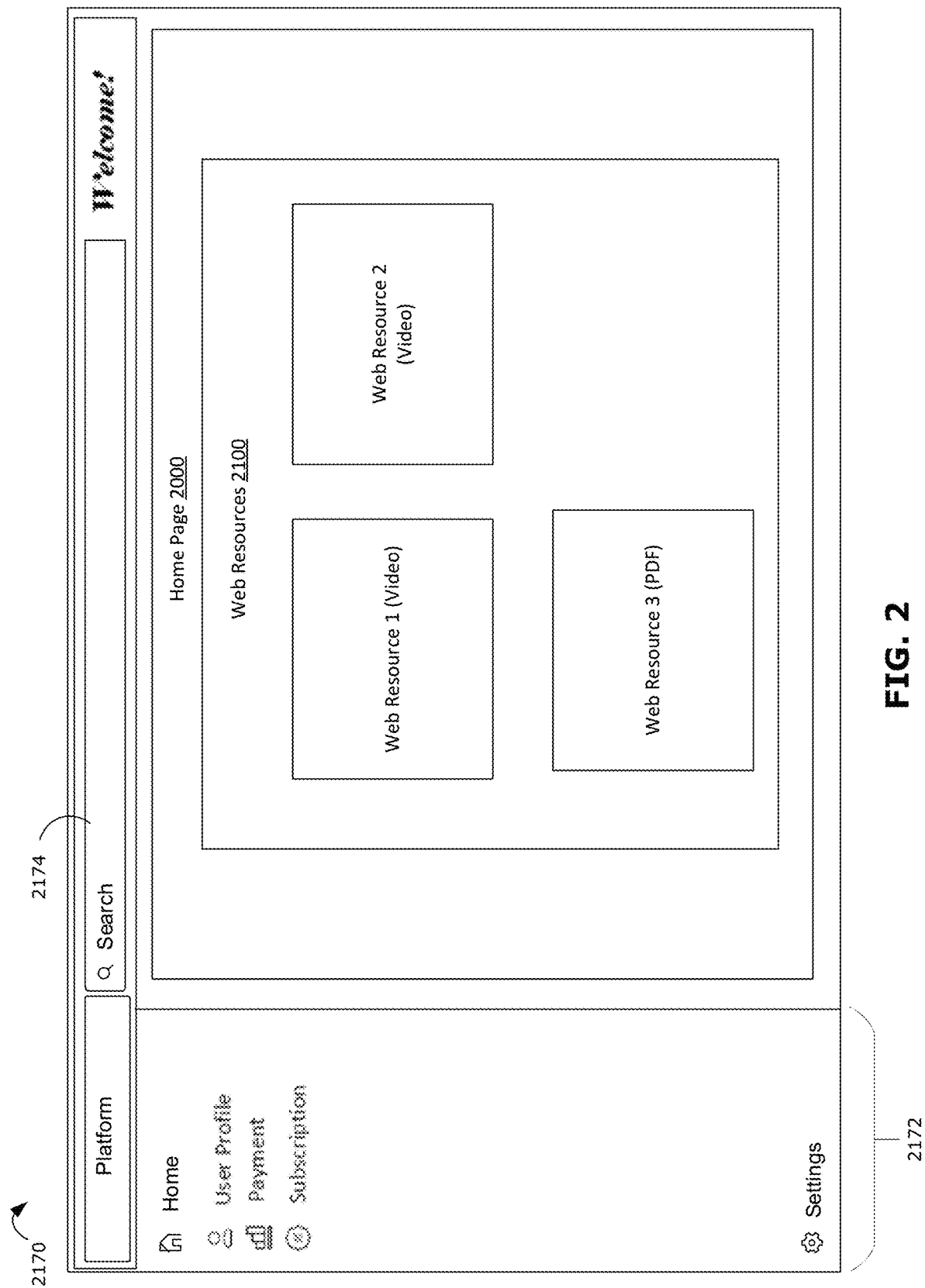
FIG. 2 is an example homepage of an administrator, which may be accessed via the platform of FIG. 1.

FIG. 2 depicts a non-limiting embodiment for a home page 2170 implemented by the administrator facility 1335. In various embodiments, a user may log in to the home page 2170 associated with their user account, such as from a browser on user device 1500, and manage aspects of a website associated with their user account, such as updating user profile, managing payment information, managing subscription references, and the like. In various embodiments, the user may be able to access the different sections of home page 2170 by using the sidebar 2172. A user may use a search bar 2174 to find web resources, pages, or other information.

The home page 2170 may present one or more web resources 2100 recommended for a user, which may be part of the recommended web resources 1322 from FIG. 1. The web resources 2100 may be presented in a number of formats, such as text, audio, video, image, and so on. Each of the web resources 2100 may be downloaded onto the user device 1500 for consumption. If a web resource 2100 is an audio or video file, it may be streamed online without the user having to explicitly download the file. In some embodiments, in the case of a text based web resource, the user may view it online by navigating to a webpage that is hosting the text file, without having to explicitly download the file first.

In some embodiments, the customization engine 1320 may request a user action to be performed while a first web resource is being consumed prior to recommending a second web resource. The user action to be performed may be performed using the administrator facility 1335.

Figure 3A:
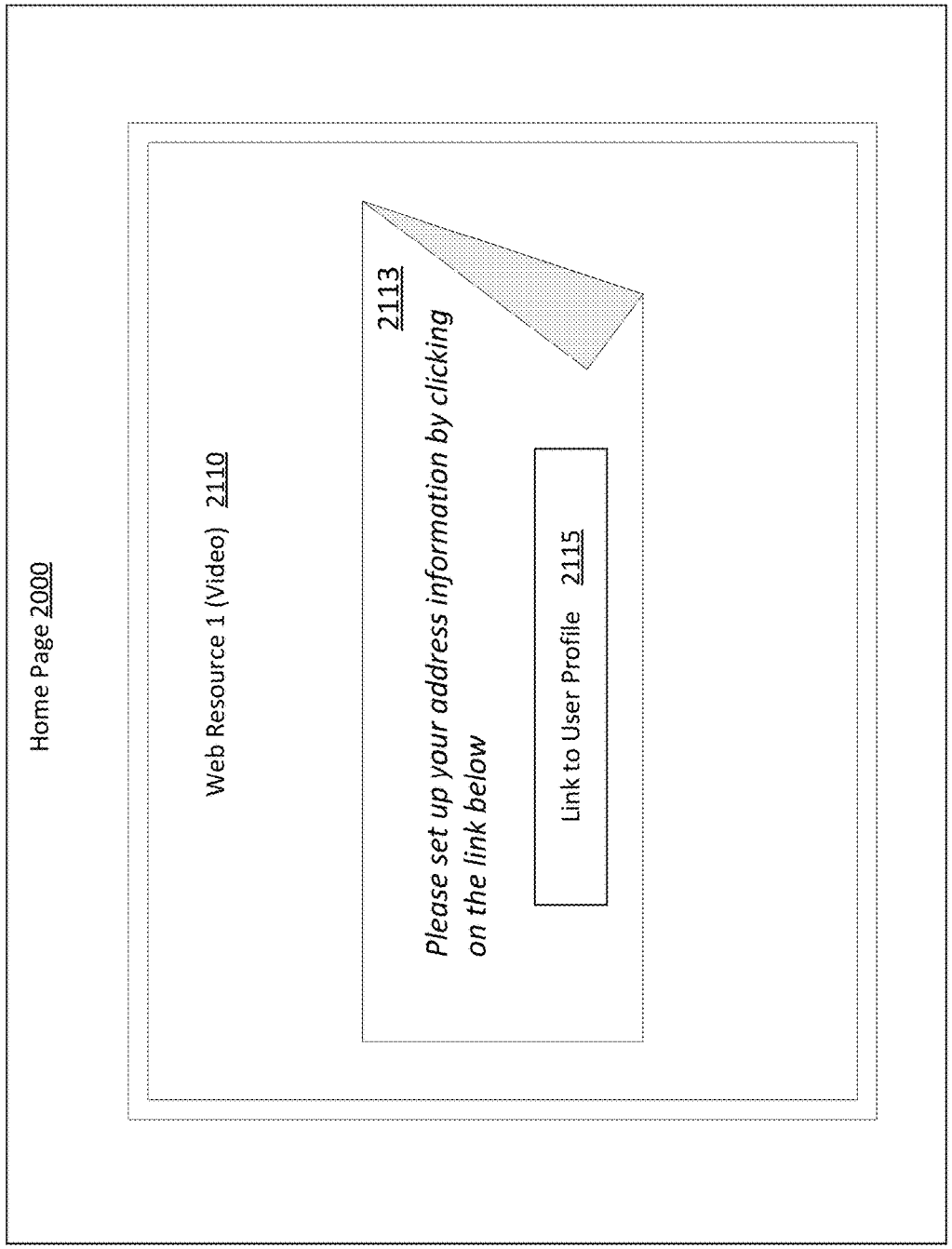
FIG. 3A is an example user interface providing a web resource, which may be accessed via the platform of FIG. 1.

For example, FIG. 3A depicts a simplified home page 2000 provided by the administrator facility 1335, which is presenting a web resource 2110 on the user device 1500 via a browser. In this embodiment, the web resource 2110 is a video file being streamed by the user. The cu Customization engine 1320 may send a message 2113 to be displayed on the user device 1500, the message 2113 requesting a user action to be performed by the user and including a web link 2115 to perform the user action. In this particular case, the user action to be performed is to set up his or her address information. The link to perform the user action 2115 is displayed within the web resource 2110 as to prompt the user to complete the requested action at his or her earliest convenience. In some embodiments, the link to perform the user action 2115 may be displayed outside of the message 2113.

The requested user action may be any action that the user may perform on a website or webpage associated with his or her user account. The user may click on the link 2115 that is displayed within the web resource 2110, which may lead to a webpage for performing the requested user action. If the web resource 2110 is a video, the link 2115 may be displayed as an overlay on top of an original video frame. If the web resource is a text or PDF file, the link 2115 may be displayed as part of the text on a specific page. If the web resource is an image, the link 2115 may be displayed within the image.

When the user clicks on the link 2115, he or she may be taken to a webpage for performing the requested user action. The webpage may be opened in a separate browser. The link may take the user to the appropriate webpage (e.g. the administrator page of the website), so he or she can add the appropriate data while the web resource 2110 is paused. The customization engine 1320 can detect the update to the configuration data after the requested user action has been performed (e.g., that the requested configuration data has been added), and the next web resource can be determined accordingly.

After the user has performed the requested user action (e.g., filling address information), the customization engine 1320 may receive a signal indicating that the requested user action has been performed. For example, when the customization engine 1320 has displayed the message 2113 including the link 2115 for performing the user action, the customization engine 1320 may, in real time or near real time, receive a signal from the data facility 1334 if valid configuration data has been added in the appropriate field(s) (e.g. address field) for the user account. After the customization engine 1320 detects that valid configuration data has been added, the customization engine 1320 may determine the update of the appropriate field(s) to be a confirmation that the requested user action has been performed. Thus, the customization engine 1320 may confirm that a requested user action has been performed, in real time or near real time (e.g., as soon as the requested action has been completed), so that the recommendation for the next web resource can be determined in real time or near real time.

Figure 3B:
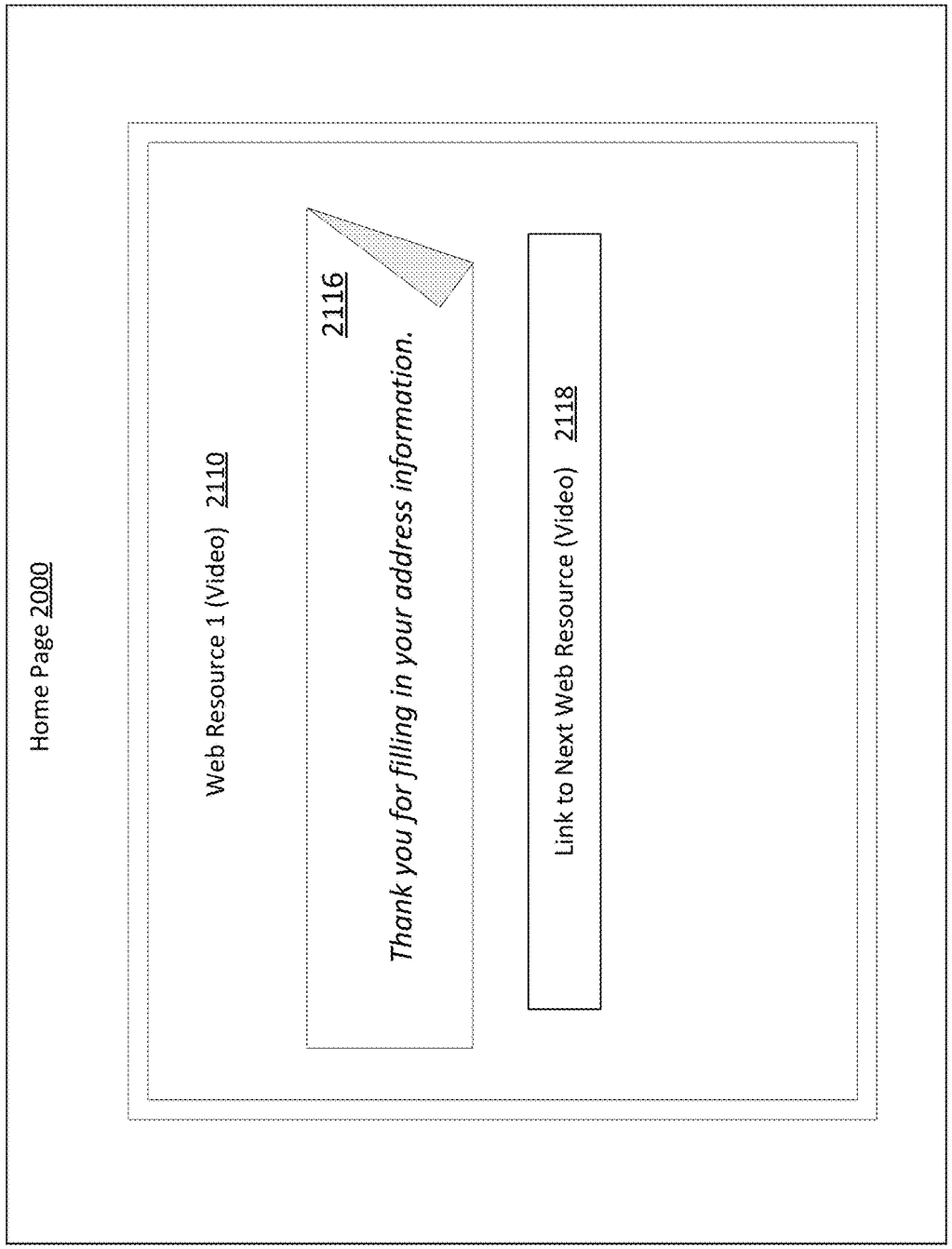
FIG. 3B is another example user interface providing a web resource, which may be accessed via the platform of FIG. 1.

FIG. 3B shows a simplified home page 2000 provided by the administrator facility 1335, which is presenting an indication of a next web resource (video) 2118 within the current web resource 2110 after the customization engine 1320 has received confirmation that the requested user action has been completed. An optional message 2116 may be displayed within the current web resource 2110 indicating that the platform 1000 has received the appropriate configuration data as a result of the requested user action. The indication of the next web resource 2118 may be, in some embodiments, a web link.

In some of the examples, the link to the next web resource 2118 may be automatically generated in real time or near real time based on the configuration data. For example, the next web resource 2118 may be determined based on address information from the configuration data obtained by the customization engine 1320. In this example, the next web resource 2118 may be a video (and/or another resource such as, for example, Portable Document Format (PDF) document) guiding a user how to further complete the user profile by providing a phone number, when the customization engine 1320 has determined that the address information from the updated configuration data is missing a phone number. For another example, the next web resource 2118 may be a publicly available answer on a webpage (e.g. an online forum or community) from other users who has met a similar challenge and resolved the challenge.

Figure 4:
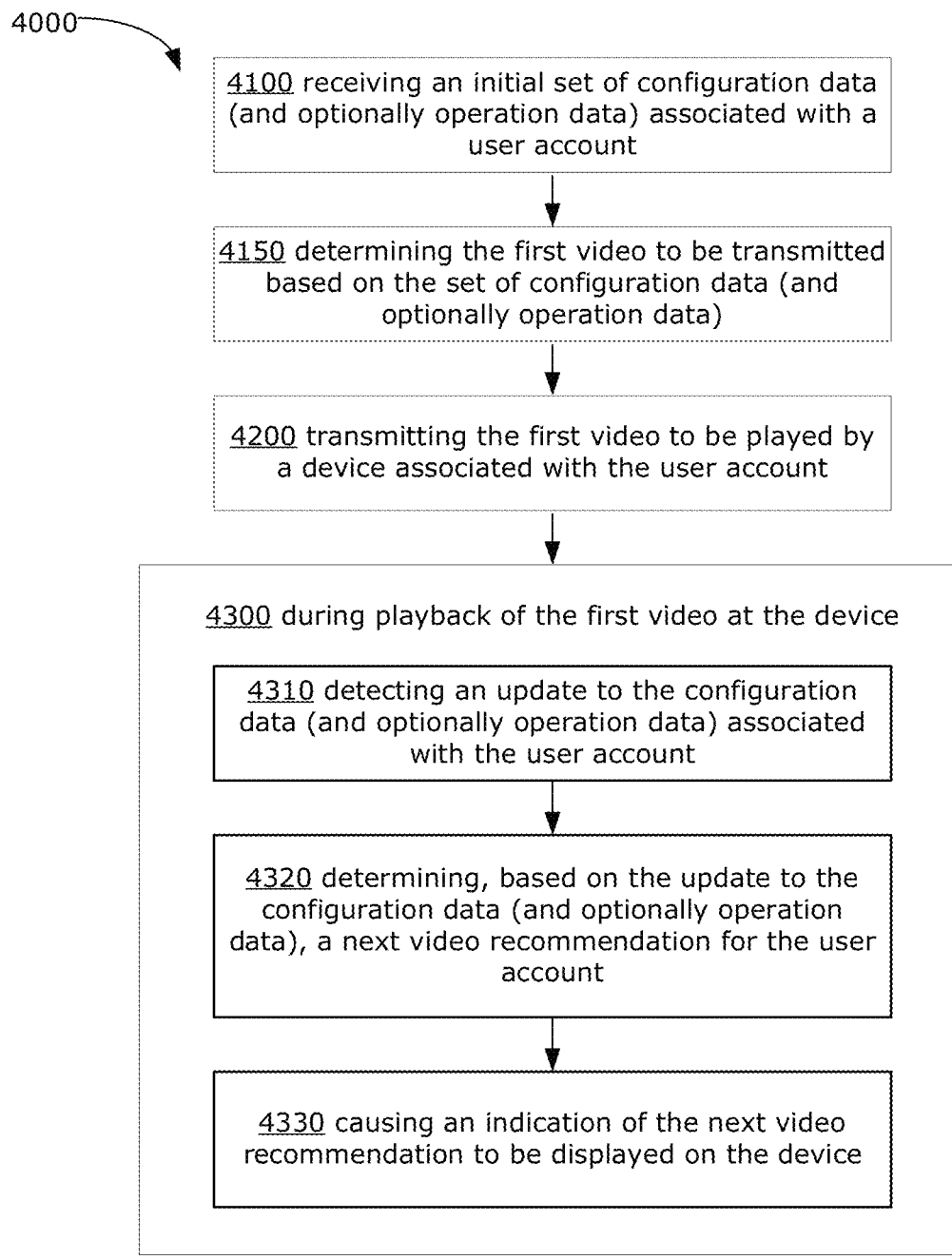
FIG. 4 is a flowchart illustrating an example method selecting and presenting a web resource in accordance with some example embodiments described herein.

Referring now to FIG. 4, which shows a flowchart illustrating an example method 4000 implemented by the platform 1000, for example using the customization engine 1320. At operation 4100, which may be an optional operation, the customization engine 1320 may receive an initial set of configuration data associated with a user account. The configuration data may be associated with, for example, a website that is associated with the user account. The website may be for example, an online store implemented by the platform 1000. In some embodiments, the configuration data may include operation data associated with the website, such as when the website is an online store, as further described below.

At operation 4150, which is optional, a first web resource 2110 may be determined for the user account, based on the initial set of configuration data (and optionally the operation data). The set of configuration data may relate to the website associated with the user account. In some embodiments, the configuration data may relate to an online store associated with the user account. When configuration data relates to an online store, the user account may be a merchant user account, and the configuration data may include operation data. For example, the configuration data may include one or more of: a product listing configuration, a marketing campaign configuration, a payment configuration associated with the merchant user account, a sales event associated with the online store, a user account setting associated with the merchant user account, an order fulfilment event associated with the online store, a shipping event associated with the online store, or a display configuration (e.g. a visual theme or property) associated of the online store.

In some embodiments, multiple web resources may be recommended based on the initial set of configuration data. That is, before transmitting the first web resource 2110, the customization engine 1320 may determine a first set or sequence of web resources to be presented at the user device 1500, based on the initial set of configuration data associated with the user account. The customization engine 1320 may determine an appropriate time to present the first set or sequence of web resources at the user device 1500. The appropriate time may be the present (e.g., at the most recent timestamp), or may be when the user has requested a set of learning plans, or when the user account has just been generated.

The set of configuration data can be used to indicate a current state of a website or user profile associated with the user account (which may be indicative of the user's knowledge regarding the platform 1000), and based on the current state of the website or user profile, the customization engine 1320 can generate a first set or sequence of web resources, which may be used to, for example, educate the user on aspects of the platform 1000 with which he or she is presumably unfamiliar.

In some embodiments, the customization engine 1320 may analyze a digital questionnaire (which may have been presented to a user to be completed when the user account is initially set up or when the user initially requests a set of learning plans) which may include answers from a user account to gain some understanding of a user, or use existing configuration data to determine the first set of web resources to present to the user device 1500 used by the user.

As an example of how a first set of web resources may be identified, in the case of a merchant user who has already added a product to his online store, he does not need to view web resources regarding how to add a product. Accordingly, a video about how to add a product to an online store may be removed from the default first set of web resources (which would normally be presented to a user account setting up an online store). Similarly, a merchant user who has already added bank account information does not need to view a web resource regarding how to add the bank account information, and the first set of web resources to be presented may be edited accordingly.

At operation 4200, the web resource 2110 may be transmitted to a user device 1500 for consumption. The web resource 2110 may be downloaded, or in the case of a video or audio, streamed by the user device 1500. When a video resource 2110 is being streamed by the user device 1500, the customization engine 1320 may keep track of how much content has been consumed or played on the user device, by for example, keeping track of how much time has lapsed in the video. The video may be paused by the customization engine 1320, if and when a user action needs to be performed before the video can continue being played.

Operation 4300 includes operations 4310, 4320 and 4330, all of which occur during the consumption of the web resource 2110 at the user device 1500.

At operation 4310, the customization engine 1320 may detect an update to configuration data associated with the user account. The configuration data may relate to the website associated with the user account.

In some embodiments, prior to detecting the update to the configuration data, a message 2113 may be generated and displayed within the first web resource 2110 on the user device 1500, the message 2113 may request a user action to be performed and include a web link to perform the user action. In this case, the update to the configuration data may indicate a confirmation that the requested user action has been performed. For example, if the requested user action in the message 2113 is to add address information (e.g. see FIG. 3A), the customization engine 1320 may poll the data facility 1334 periodically (e.g. every 10 seconds) to check if the address information has been successfully added. Alternatively, the data facility 1334 may push a notification to the customization engine 1320 after the configuration data has been updated with the address information. After valid address information has been detected, the customization engine 1320 may consider the address information to be an update to the configuration data, and proceed to recommend the next web resource based on the update to the configuration data in operation 4320.

In some embodiments, the configuration data may relate to an online store associated with the user account. When the configuration data relate to an online store, the user account may be an merchant user account, and the update to the configuration data may, for example, include an update relating to: When configuration data relate to an online store, the user account may be an merchant user account, and the configuration data may, for example, include one or more of: a product listing configuration, a marketing campaign configuration, a payment configuration associated with the merchant user account, a sales event associated with the online store, a user account setting associated with the merchant user account, an order fulfilment event associated with the online store, a shipping event associated with the online store, or a display configuration (e.g. a visual theme or property) associated of the online store.

At operation 4320, the customization engine 1320 may determine, based on the update to the configuration data associated with the user account, a next web resource for the user account. The web resource may be recommended by the customization engine 1320 based on a number of criteria. Each web resource may be associated with one or more criteria that need to be satisfied before the web resource is presented to the user device 1500. In some embodiments, an update might not result in any resource recommendation, if the update does not relate to any criterion that is required by any web resource.

In some embodiments, a web resource may be recommended for the user account if all the required criteria can be satisfied, or found in association with the user account. In some cases, viewing or downloading of a first web resource may be a criterion for a second web resource to be recommended next. If multiple web resources are to be recommended, a recommendation sequence may be determined. The sequence may be with a random order or based on some predetermined setting (e.g. a default order). Alternatively, multiple web resources (e.g. video links) may be recommended and presented at the same time, with each web resource having a brief description, so the user may select which web resource to view next.

As an example, when the set of configuration data relates to the website associated with the user account, and when the website is an online store, the update to the configuration data may represent that a product listing has been added by the user (e.g., there is a product page or inventory entry associated with the online store), or bank account information associated with the online store has been set up on the platform. The customization engine 1320 may be configured to choose a web resource that is related to a next step that the user is supposedly unfamiliar with: e.g., adding 3D images for the product, if 3D images have not been uploaded to the product listing. For another example, the customization engine 1320 may be configured to choose a web resource that is related to adding business tax account information, if such information is missing from the configuration data after the bank account information has been added.

Conversely, each web resource may also be associated with one or more criteria for removing the web resource from the first set or sequence of web resources. For example, when the customization engine 1320 detects that address information has successfully been added to the user profile or online account, the web resource relating solely to adding address information may be removed from the first set or sequence of web resources previously generated based on the previous set of configuration data.

At step 4330, the customization engine 1320 may cause an indication of the next web resource to be displayed on the device. The indication of the next web resource may be a link to the next web resource, where the link is configured to be displayed within the first or current web resource. In the case of the first or current web resource being a video, the link may be displayed as an overlay on top of a video frame at an appropriate time within the video (e.g. using a picture-in-picture mode). The user can then click on the link within the video, and be taken to the next web resource.

In some embodiments, the recommended next web resource may be used to dynamically update the first list of web resources for the user account in real time or near real time. For example, the customization engine 1320 may dynamically add the recommended next web resource to the first list of web resources (if the recommended next web resource was not previously included in the first list of web resources). For another example, the customization engine 1320 may change an order of the web resources to be presented based on the update to the configuration data associated with the user account (e.g., to place the recommended next web resource at the front of the order). For another example, the customization engine 1320 may remove one or more web resources from the first list of web resources based on the update to the configuration data associated with the user account.

Figure 5:
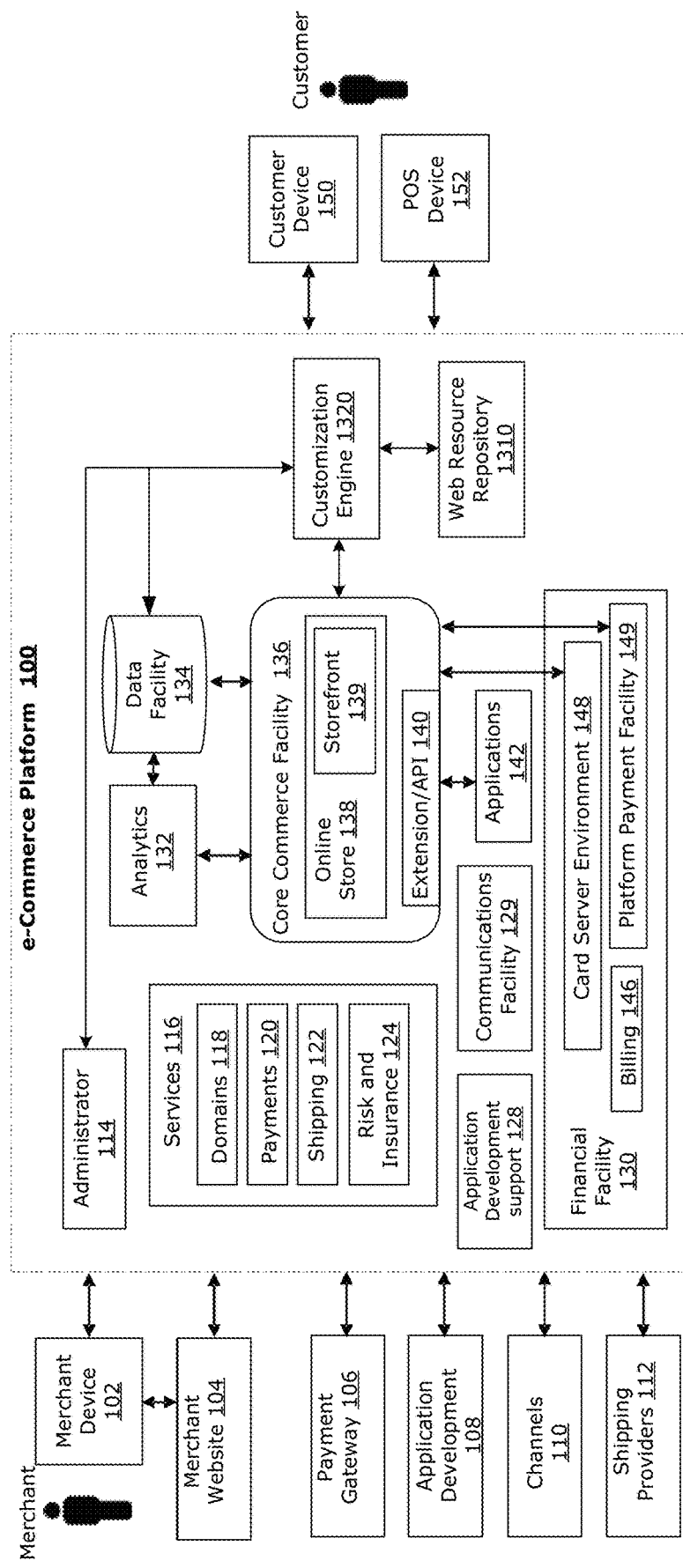
FIG. 5 is a block diagram of an example e-commerce platform, in which examples described herein may be implemented.

As mentioned, the platform 1000 in FIG. 1 may be an e-commerce platform, and the user may be a merchant user of the e-commerce platform. With reference to FIG. 5, an embodiment e-commerce platform 100 is depicted for providing merchant products and services to customers. The e-commerce platform 100 may include a web resource repository 1310 and a customization engine 1320 with similar functionalities to those described above in relation to platform 1000 in FIG. 1. A merchant device 102 or a customer device 150 may act as a user device with similar functionalities to user device 1500 described above in relation to platform 1000 in FIG. 1. While the following portion of the disclosure contemplates using the apparatus, system, and process disclosed to purchase products and services, for simplicity the description herein will refer to products or offerings. More broadly, all references to products or offerings throughout this disclosure should also be understood to be references to products and/or services, including physical products, digital content, tickets, subscriptions, services to be provided, and the like.

While the following disclosure contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, it should be understood that aspects of the e-commerce platform 100 may be more generally available to support users in an e-commerce environment, and all references to merchants and customers throughout this disclosure should also be understood to be references to users, such as where a user is a merchant-user (e.g., a seller, retailer, wholesaler, or provider of products), a marketer-user (e.g., a marketing agent, an external marketing service provider, or a self-marketing merchant), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Further, it should be understood that any individual or group of individuals may play more than one role and may fit more than one label in the e-commerce environment. For example, a merchant may be a marketer, or a corporate user may also be a customer.

The e-commerce platform 100 may provide a centralized system for providing merchants with online resources for managing their business. Merchants may utilize the e-commerce platform 100 for managing commerce with customers, such as by implementing an e-commerce experience with customers through an online store 138, through channels 110, through point of sale (POS) devices 152 in physical locations (e.g., a physical storefront or other location such as through a kiosk, terminal, reader, printer, 3D printer, and the like), by managing their business through the e-commerce platform 100, by interacting with customers through a communications facility 129 of the e-commerce platform 100, or any combination thereof.

The online store 138 may represent a multitenant facility comprising a plurality of virtual storefronts 139. In various embodiments, merchants may manage one or more storefronts 139 in the online store 138, such as through a merchant device 102 (e.g., computer, laptop computer, mobile computing device, and the like), and offer products to customers through a number of different channels 110 (e.g., an online store 138; a physical storefront through a POS device 152; electronic marketplace, through an electronic buy button integrated into a website or social media channel such as on a social network, social media page, social media messaging system; and the like). A merchant may sell across channels 110 and then manage their sales through the e-commerce platform 100. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront 139 through the online store 138, and utilizing the communications facility 129 to leverage customer interactions and analytics 132 to improve the probability of sales, for example.

In various embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication, and the like, providing a system for reaching customers and facilitating merchant services for the real or virtual pathways available for reaching and interacting with customers.

In various embodiments, and as described further herein, the e-commerce platform 100 may be implemented through a processing facility including a processing device and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application development 108, channels 110, shipping providers 112, customer devices 150, POS devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a thin client via a web browser, accessed through by POS devices, and the like). In various embodiments, elements of the e-commerce platform 100 may be implemented to operate on various platforms and operating systems, such as iOS, Android, over the internet, and the like.

In various embodiments, storefronts 139 may be served by the e-commerce platform 100 to customers (e.g., via customer devices 150), where customers can browse and purchase the various products available (e.g., add them to a cart, purchase immediately through a buy-button, and the like). Storefronts 139 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their storefront 139. Merchants may customize the look and feel of their website through a theme system, such as where merchants can select and change the look and feel of their storefront 139 by changing their theme while having the same underlying product and business data shown within the storefront's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a basic content management system for website content. Merchants may author blog posts or static pages and publish them to their storefront 139 and/or website 104, such as through blogs, articles, and the like, as well as configure navigation menus. Merchants may upload images (e.g., for products), video, content, data, and the like to the e-commerce platform 100, such as for storage by the system. In various embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110, including the online store 138, over the telephone, as well as through physical POS devices 152 as described herein. The e-commerce platform 100 may provide business support services 116, an administrator component 114, and the like associated with running an online business, such as providing a domain service 118 associated with their online store, payments services 120 for facilitating transactions with a customer, shipping services 122 for providing customer shipping options for purchased products, risk and insurance services 124 associated with product protection and liability, merchant billing services 146, and the like. Services 116 may be provided via the e-commerce platform 100 or in association with external facilities, such as through a payment gateway 106 for payment processing, shipping providers 112 for expediting the shipment of products, and the like.

In various embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Referring now to the customization engine 1320 and the web resource repository 1310 in FIG. 5, the customization engine 1320 may be implemented to generate one or more recommended web resources, such as videos or audio files, based on a set of configuration data that is obtained in real time or near real time from the data facility 134, the core facility 136 and/or the administrator facility 114. The data facility 134, core facility 136 and/or administrator facility 114 may be similar to, or the same as, the respective data facility 1334, core facility 1336 and/or administrator facility 1335 of FIG. 1.

The web resource repository 1310 may be a database storing one or more web resources may be known as a web resource repository 1310 (the "repository 1310"). The repository 1310 may be a standalone database, or may be part of data facility 134. The repository 1310 may store one or more types of web resources, which may include, for example, audio files, video files, text files 1315, and other types of resource files, such as for example images, HTML files, various types of documents, and so on. Each of these web resources may be associated with a set of access criteria, which need to be satisfied prior to granting a user access to the web resource. The access criteria may include, for example, one or more of: a user level, a prerequisite requirement, a payment requirement, a user account or website configuration requirement, a geographical limitation, and any other suitable access requirement(s).

As an optional step, the customization engine 1320 may retrieve or receive an initial set of configuration data associated with a merchant user account. The configuration data may be associated with, for example, an online store that is associated with the merchant user account. The initial set of configuration data may be used to determine one or more web resources for the merchant user account. In some embodiments, the initial set of configuration data may include operation data of the online store. For example, the initial set of configuration data may include one or more of: a product listing configuration, a marketing campaign configuration, a payment configuration associated with the merchant user account, a sales event associated with the online store, a user account setting associated with the merchant user account, an order fulfilment event, a shipping event, a modification event associated with display configuration (e.g., a visual theme or property) of the online store, and so on.

As described above, when the configuration data is from an online store, it may include real-time (or near real-time) operation data of the online store. In some embodiments, the operation data may include, for example, one or more of: real-time (or near real-time) sales data, real-time (or near real-time) order data, real-time (or near real-time) marketing data, real-time (or near real-time) user subscription data, real-time (or near real-time) shipment data, real-time (or near real-time) order fulfilment data, and so on.

In some embodiments, multiple web resources, such as multiple video files, may be recommended based on the initial set of configuration data. That is, before transmitting the first web resource, the customization engine 1320 can determine a first set or sequence of web resources to be presented at the merchant user device 102, based on the initial set of configuration data associated with the merchant user account. The customization engine 1320 may further determine an appropriate time for presenting the first set or sequence of web resources to the merchant user device 102.

The appropriate time may be the present (e.g., at the most recent timestamp), or may be when the merchant user has requested a set of learning plans, or when the merchant user account has just been generated, or when a new online store has just been set up.

In the following discussion, a video is used as an example of a web resource that is transmitted and presented on the merchant device 102. It should be understood that the web resource may be of a file format or type other than a video. As described above, the web resource may be a video, an audio, a PDF document, a simple text file, and so on.

In some example embodiments, while a current video (e.g. from the first set of videos) is being streamed on a merchant device 102, one or more subsequent videos can be determined, in real time and dynamically, based on real time configuration data associated with an online store of the merchant user.

For example, the merchant user may be watching a video and interacting (e.g., in a separate browser window) with the e-commerce platform 100 via the administrator page. The merchant user may perform a user action, which may result in one or more updates to the configuration date of the online store. The update to the configuration data may be used to determine the next video, and a link of the next video can be displayed as an overlay on top of, or embedded within the video being watched.

In some embodiments, the web resource is a video file being streamed by the merchant user. The customization engine 1320 may send a message to be displayed on the merchant device 102, the message requesting a specific user action to be performed by the merchant user and including a web link to perform the user action. The link to perform the user action may be displayed within the message and overlaid on top of the video frame, as to prompt the user to complete the requested user action at his or her earliest convenience.

The requested user action may be any action that the merchant user may perform on an online store associated with his or her user account. The merchant user may click on the link, which may lead to a web page for performing the requested user action. The web page may be opened in a separate browser. The link may take the user to, for example, the administrator page of the online store, so he can add the appropriate data while the video is paused.

After the user has performed the requested user action (e.g., filling address information), the customization engine 1320 may receive a signal indicating that the requested user action has been performed. For example, when the customization engine 1320 has displayed a message including the link for performing the user action, it may, in real time or near real time, receive a signal from the data facility 134 indicating that valid configuration data has been entered in the appropriate field(s) (e.g. address field) for the online store. After the customization engine 1320 detects that valid configuration data has been added, the customization engine 1320 may take the update of the appropriate field(s) as a confirmation that the requested user action has been performed.

For another example, the merchant user may add a product page to a storefront, and after the customization engine 1320 detects that a product page has been added to the storefront by the merchant user account, the next web resource may be determined to be a web resource regarding uploading a product image.

For yet another example, when the merchant user adds a payment rail for the online store, and the customization engine 1320 detects that the added payment rail is associated with a financial institution based in Canada, a next (potentially, the immediate next) recommended web resource may be about how to setup the online store to pay Canadian taxes.

In some embodiments, even if a user action is not involved, there may still be an update to the configuration data of the online store, for example when the configuration data also include operation data of the online store. For instance, for a new online store, if a first sale is detected (e.g., based on updated real-time sales data associated with the online store), then the next recommended web resource can be regarding how to process a first sale. For yet another example, if the update to the configuration data (which may include operation data) indicates that a most recent product listing offered by the online store has alcohol content, the next recommended web resource can be about how to setup the online store to comply with appropriate regulations.

In some embodiments, when a user attempts to accomplish the action requested in the currently presented web resource (e.g., a video that is currently being presented), but is struggling in some way, the customization engine 1320 may detect that the user has been unable to successfully complete the action and recommend another web resource that gives a more in-depth explanation of the task at hand. For example, the customization engine 1320 may detect that the requested user action has only been partially completed (e.g., the requested configuration data has been only partially entered, or has been incorrectly entered), which may be an indication that the user requires more explanation to complete the requested user action. For another example, the customization engine 1320 may detect that the requested user action has not been completed by the end of the playback of the current video, which may be an indication that the user requires more explanation (or further prompting) to complete the requested user action.

In some embodiments, a web resource may have a binary flag indicative of whether it has been shown to a user in the past. Alternatively or concurrently, an access log may include data indicating which web resources have been viewed by each respective merchant user. When a web resource has already been shown to the merchant user in the past, the web resource may not be recommended again by the customization engine 1320, regardless of any real time data received.

In some embodiments, when a web resource has already been shown to the merchant user in the past, it could be recommended again (e.g., as a "refresher") if, for example, the merchant user has made a settings change that suggests a need to revisit the topic described in that web resource. For example, the merchant user may have already set up sales taxes for their province or state, then the customization engine 1320 detects a new change that indicates the billing address to be located in a different province or state, so the next web resource recommendation may be regarding the sales tax again, even if it has been viewed in the past. In some embodiments, the customization engine 1320 may send a message to the merchant device 102 to query if the user would like to view a web resource again, when the web resource has been viewed by the user in the past, and has been determined as a recommended web resource to be played next.

In some embodiments, the first set or sequence of web resources (e.g., videos) initially prepared for the merchant user account may be updated to: include the new web resource that has been most recently added to the set or sequence of web resources, to remove one or more web resources previously in the set or sequence, or (in the case where the web resources are videos) to change the playback order of the sequence of videos, when a playlist is used to stream the sequence of videos for the merchant device 102.

After the next web resource has been determined based on an update to the configuration date of the online store for a merchant user, the customization engine 1320 may, in real time or near real time, cause an indication of the next web resource to be displayed on the merchant device 102. The indication of the next web resource may be a link to the next web resource, where the link is configured to be displayed within the web resource currently being consumed on the merchant device 102. For example, the link may be displayed as an overlay on top of a video frame at an appropriate time within the video (e.g. using a picture-in-picture mode). The merchant user can then click on the link within the video currently streamed on the merchant device 102, and be taken to the next web resource, without having to finish the current video.

Compared to the existing approach, the disclosed methods and systems make use of real time, contextual information, which may include insight into a current state of the merchant user's online store(s). Any real time or near real time data regarding the merchant user, or the merchant's store, may be used to generate the web resource that is to be shown next.

The dynamic, real-time determination and display of a web resource (e.g. video) link can reduce the need for a user to manually select a next web resource, thereby reducing the number of user actions required to receive the most applicable and appropriate knowledge (e.g. during a training course), as the user learns to how to navigate the e-commerce platform 100 and set up his or her online store(s).

FIG. 6 depicts a non-limiting embodiment for a home page 170 of an administrator 114, which may show information about daily tasks, a store's recent activity, and the next steps a merchant can take to build their business. In various embodiments, a merchant may log in to administrator 114, such as from a browser or mobile device, and manage aspects of their storefront, such as viewing the storefront's recent activity, updating the storefront's catalog, managing orders, recent visits activity, total orders activity, and the like. In various embodiments, the merchant may be able to access the different sections of administrator 114 by using the sidebar 172, such as shown on FIG. 6. Sections of the administrator may include core aspects of a merchant's business, including orders, products, and customers; sales channels, including the online store, POS, and buy button; applications installed on the merchant's account; settings applied to a merchant's storefront 139 and account. A merchant may use a search bar 174 to find products, pages, or other information. Depending on the device the merchant is using, they may be enabled for different functionality through the administrator 114. For instance, if a merchant logs in to the administrator 114 from a browser, they may be able to manage all aspects of their storefront 139. If the merchant logs in from their mobile device, they may be able to view all or a subset of the aspects of their storefront 139, such as viewing the storefront's recent activity, updating the storefront's catalog, managing orders, and the like.

More detailed information about commerce and visitors to a merchant's storefront 139 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110 from different periods of time (e.g., days, weeks, months, and the like), such as by using drop-down menus 176. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's storefront 139, such as based on account status, growth, recent customer activity, and the like. Notifications may be provided to assist a merchant with navigating through a process, such as capturing a payment, marking an order as fulfilled, archiving an order that is complete, and the like.

Reference is made back to FIG. 5. The e-commerce platform may provide for a communications facility 129 and associated merchant interface for providing electronic communications and marketing, such as utilizing an electronic messaging aggregation facility (not shown) for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 130 for secure financial transactions with customers, such as through a secure card server environment 148. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 130 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In various embodiments, online store 138 may support a great number of independently administered storefronts 139 and process a large volume of transactional data on a daily basis for a variety of products. Transactional data may include customer contact information, billing information, shipping information, information on products purchased, information on services rendered, and any other information associated with business through the e-commerce platform 100. In various embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

In various embodiments, the e-commerce platform 100 may be configured with a core commerce facility 136 for content management and task automation to enable support and services to the plurality of storefronts 139 (e.g., related to products, inventory, customers, orders, collaboration, suppliers, reports, financials, risk and fraud, and the like), but be extensible through applications 142 that enable greater flexibility and custom processes required for accommodating an ever-growing variety of merchant storefronts 139, POS devices 152, products, and services. For instance, the core commerce facility 136 may be configured for flexibility and scalability through portioning (e.g., sharding) of functions and data, such as by customer identifier, order identifier, storefront identifier, and the like. The core commerce facility 136 may accommodate store-specific business logic and a web administrator. The online store 138 may represent a channel, be embedded within the core commerce facility 136, provide a set of support and debug tools that support uses for merchants, and the like. The core commerce facility 136 may provide centralized management of critical data for storefronts 139.

The core commerce facility 136 includes base or "core" functions of the e-commerce platform 100, and as such, as described herein, not all functions supporting storefronts 139 may be appropriate for inclusion. For instance, functions for inclusion into the core commerce facility 136 may need to exceed a core functionality threshold through which it may be determined that the function is core to a commerce experience (e.g., common to a majority of storefront activity, such as across channels, administrator interfaces, merchant locations, industries, product types, and the like), is re-usable across storefronts (e.g., functions that can be re-used/modified across core functions), limited to the context of a single storefront at a time (e.g., implementing a storefront 'isolation principle', where code should not be able to interact with multiple storefronts at a time, ensuring that storefronts cannot access each other's data), provide a transactional workload, and the like. Maintaining control of what functions are implemented may enable the core commerce facility 136 to remain responsive, as many required features are either served directly by the core commerce facility 136 or enabled by its extension/application programming interface (API) 140 connection to applications 142. If care is not given to restricting functionality in the core commerce facility 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the core commerce facility 136 may be configured to maintain responsiveness, such as through configuration that utilizes timeouts, queues, back-pressure to prevent degradation, and the like.

Although isolating storefront data is important to maintaining data privacy between storefronts 139 and merchants, there may be reasons for collecting and using cross-store data, such as for example, with an order risk assessment system or a platform payment facility, both of which require information from a majority of storefronts 139 to perform well. In various embodiments, rather than violating the isolation principle, it may be preferred to move these components out of the core commerce facility 136 and into their own infrastructure within the e-commerce platform 100. For example, the data facility 134 and analytics 132 may be located outside the core commerce facility 136.

In various embodiments, the e-commerce platform 100 may provide for a platform payment facility 149, which is another example of a component that utilizes data from the core commerce facility 138 but may be located outside so as to not violate the isolation principle. The platform payment facility 149 may allow customers interacting with storefronts 139 to have their payment information stored safely by the core commerce facility 136 such that they only have to enter it once. When a customer visits a different storefront 139, even if they've never been there before, the platform payment facility 149 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from a storefront's checkout, allowing information to be made available globally across storefronts 139. It would be difficult and error prone for each storefront 139 to be able to connect to any other storefront 139 to directly retrieve the payment information stored there. As a result, the platform payment facility 149 may be implemented external to the core commerce facility 136.

For those functions that are not included within the core commerce facility 138, applications 142 provide a way to add features to the e-commerce platform 100. Applications 142 may be able to access and modify data on a merchant's storefront 139, perform tasks through the administrator 114, create new flows for a merchant through a user interface (e.g., that is surfaced through extensions/API 140), and the like. Merchants may be enabled to discover and install applications 142 through application searching 208 and application recommendations 210 (see FIG. 7). In various embodiments, core products, core extension points, applications, and the administrator 114 may be developed to work together. For instance, application extension points may be built inside the administrator 114 so that core features may be extended by way of applications 142, which may deliver functionality to a merchant through the extension/API 140.

In various embodiments, applications 142 may deliver functionality to a merchant through the extension/API 140, such as where an application 142 is able to surface transaction data to a merchant (e.g., App: "Surface my app in mobile and web admin using the embedded app SDK"), and/or where the core commerce facility 136 is able to ask the application to perform work on demand (core: "App, give me a local tax calculation for this checkout").

Applications 142 may support storefronts 139 and channels 110, provide merchant support, integrate with other services, and the like. Where the core commerce facility 136 may provide the foundation of services to the storefront 139, the applications 142 may provide a way for merchants to satisfy specific and sometimes unique needs. Different merchants will have different needs, and so may benefit from different applications 142. Applications 142 may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142 may be connected to the core commerce facility 136 through an extension/API layer 140, such as utilizing APIs to expose the functionality and data available through and within the core commerce facility 136 to the functionality of applications (e.g., through REST, GraphQL, and the like). For instance, the e-commerce platform 100 may provide API interfaces to merchant and partner-facing products and services, such as including application extensions, process flow services, developer-facing resources, and the like. With customers more frequently using mobile devices for shopping, applications 142 related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the core commerce facility 136, thus providing merchants what they need when they need it. For instance, shipping services 122 may be integrated with the core commerce facility 136 through a shipping or carrier service API, thus enabling the e-commerce platform 100 to provide shipping service functionality without directly impacting code running in the core commerce facility 136.

Many merchant problems may be solved by letting partners improve and extend merchant workflows through application development, such as problems associated with back-office operations (merchant-facing applications) and in the storefront (customer-facing applications). As a part of doing business, many merchants will use mobile and web related applications on a daily basis for back-office tasks (e.g., merchandising, inventory, discounts, fulfillment, and the like) and storefront tasks (e.g., applications related to their online shop, for flash-sales, new product offerings, and the like), where applications 142, through extension/API 140, help make products easy to view and purchase in a fast growing marketplace. In various embodiments, partners, application developers, internal applications facilities, and the like, may be provided with a software development kit (SDK), such as through creating a frame within the administrator 114 that sandboxes an application interface. In various embodiments, the administrator 114 may not have control over nor be aware of what happens within the frame. The SDK may be used in conjunction with a user interface kit to produce interfaces that mimic the look and feel of the e-commerce platform 100, such as acting as an extension of the core commerce facility 136.

Applications 142 that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the core commerce facility 136, such as for synchronizing a local database, notifying an external integration partner, and the like. Update events may enable this functionality without having to poll the core commerce facility 136 all the time to check for updates, such as through an update event subscription. In various embodiments, when a change related to an update event subscription occurs, the core commerce facility 136 may post a request, such as to a predefined callback URL. The body of this request may contain a new state of the object and a description of the action or event. Update event subscriptions may be created manually, in the administrator facility 114, or automatically (e.g., via the API). In various embodiments, update events may be queued and processed asynchronously from a state change that triggered them, which may produce an update event notification that is not distributed in real-time.

Figure 7:
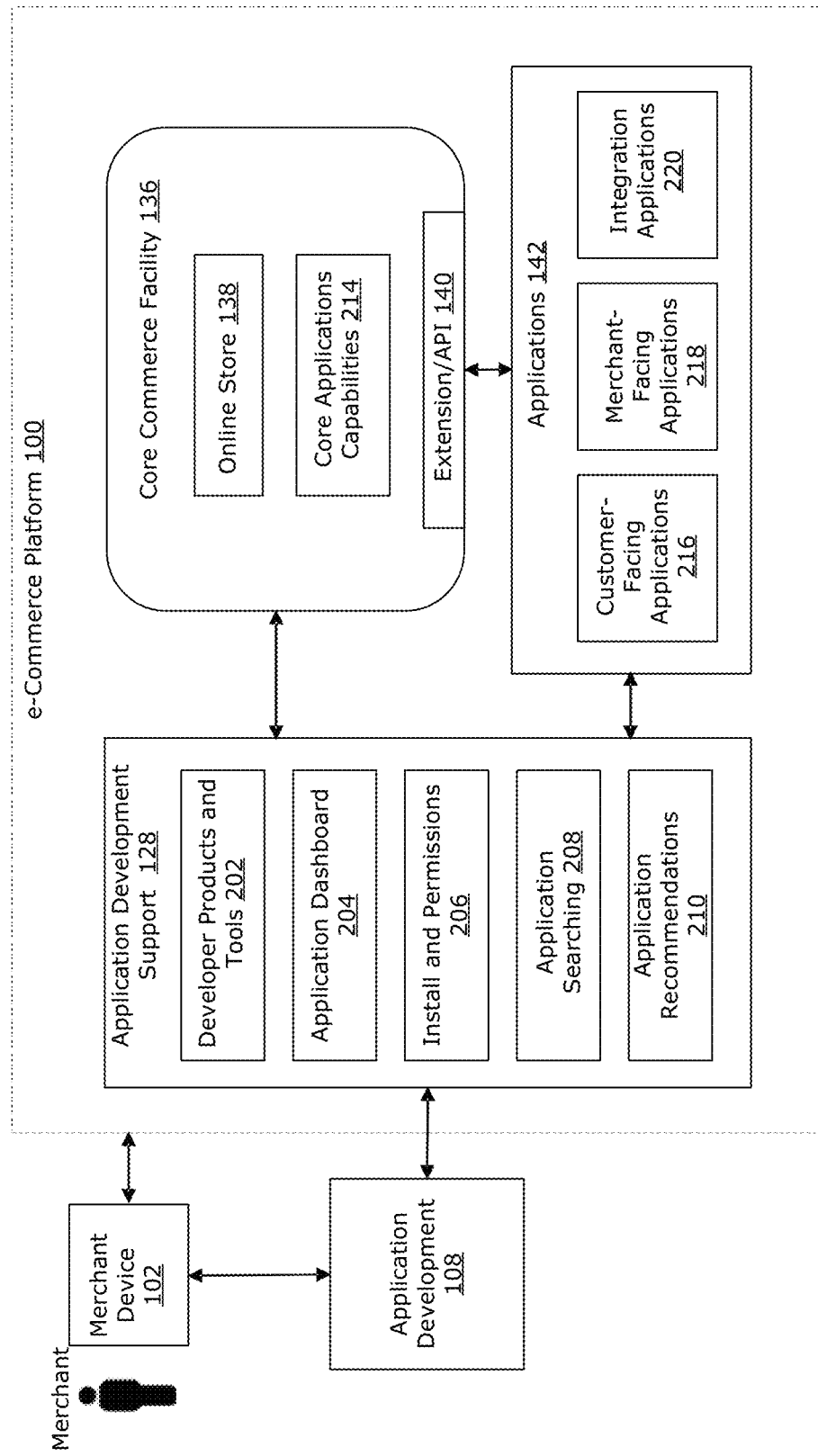
FIG. 7 is another block diagram of the e-commerce platform of FIG. 5, showing some details related to application development.

Reference is made to FIG. 7, which is another depiction of the e-commerce platform 100. FIG. 7 omits some details that have been described with reference to FIG. 5, and shows further details discussed below. In various embodiments, the e-commerce platform 100 may provide application development support 128. Application development support 128 may include developer products and tools 202 to aid in the development of applications, an application dashboard 204 (e.g., to provide developers with a development interface, to administrators for management of applications, to merchants for customization of applications, and the like), facilities for installing and providing permissions 206 with respect to providing access to an application 142 (e.g., for public access, such as where criteria must be met before being installed, or for private use by a merchant), application searching 208 to make it easy for a merchant to search for applications 142 that satisfy a need for their storefront 139, application recommendations 210 to provide merchants with suggestions on how they can improve the user experience through their storefront 139, a description of core application capabilities 214 within the core commerce facility 136, and the like. These support facilities may be utilized by application development 108 performed by any entity, including the merchant developing their own application 142, a third-party developer developing an application 142 (e.g., contracted by a merchant, developed on their own to offer to the public, contracted for use in association with the e-commerce platform 100, and the like), or an application being developed by internal personal resources associated with the e-commerce platform 100. In various embodiments, applications 142 may be assigned an application identifier (ID), such as for linking to an application (e.g., through an API), searching for an application, making application recommendations, and the like.

The core commerce facility 136 may include base functions of the e-commerce platform 100 and expose these functions through APIs to applications 142. The APIs may enable different types of applications built through application development 108. Applications 142 may be capable of satisfying a great variety of needs for merchants but may be grouped roughly into three categories: customer-facing applications 216, merchant-facing applications 218, or integration applications 220. Customer-facing applications 216 may include storefront 139 or channels 110 that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 218 may include applications that allow the merchant to administer their storefront 139 (e.g., through applications related to the web or website or to mobile devices), run their business (e.g., through applications related to POS devices 152), to grow their business (e.g., through applications related to shipping (e.g., drop shipping), use of automated agents, use of process flow development and improvements), and the like. Integration applications 220 may include applications that provide useful integrations that participate in the running of a business, such as shipping providers 112 and payment gateways.

In various embodiments, an application developer may use an application proxy to fetch data from an outside location and display it on the page of an online storefront 139. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142 so that the core commerce facility 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110, adds what they intend to buy to their cart, proceeds to checkout, and pays for the content of their cart resulting in the creation of an order for the merchant. The merchant may then view and fulfill (or cancel) the order. The product is then delivered to the customer. If the customer is not satisfied, they might return the products to the merchant.

In an example embodiment, a customer may browse a merchant's products on a channel 110. A channel 110 is a place where customers can view and buy products. In various embodiments, channels 110 may be modeled as applications 142 (a possible exception being the online store 138, which is integrated within the core commence facility 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In various embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110 may use the core commerce facility 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through the card server environment 148. In various embodiments, the payment gateway 106 may accept international payment, such as integrating with leading international credit card processors. The card server environment 148 may include a card server application, card sink, hosted fields, and the like. This environment may act as the secure gatekeeper of the sensitive credit card information.

Figure 8:
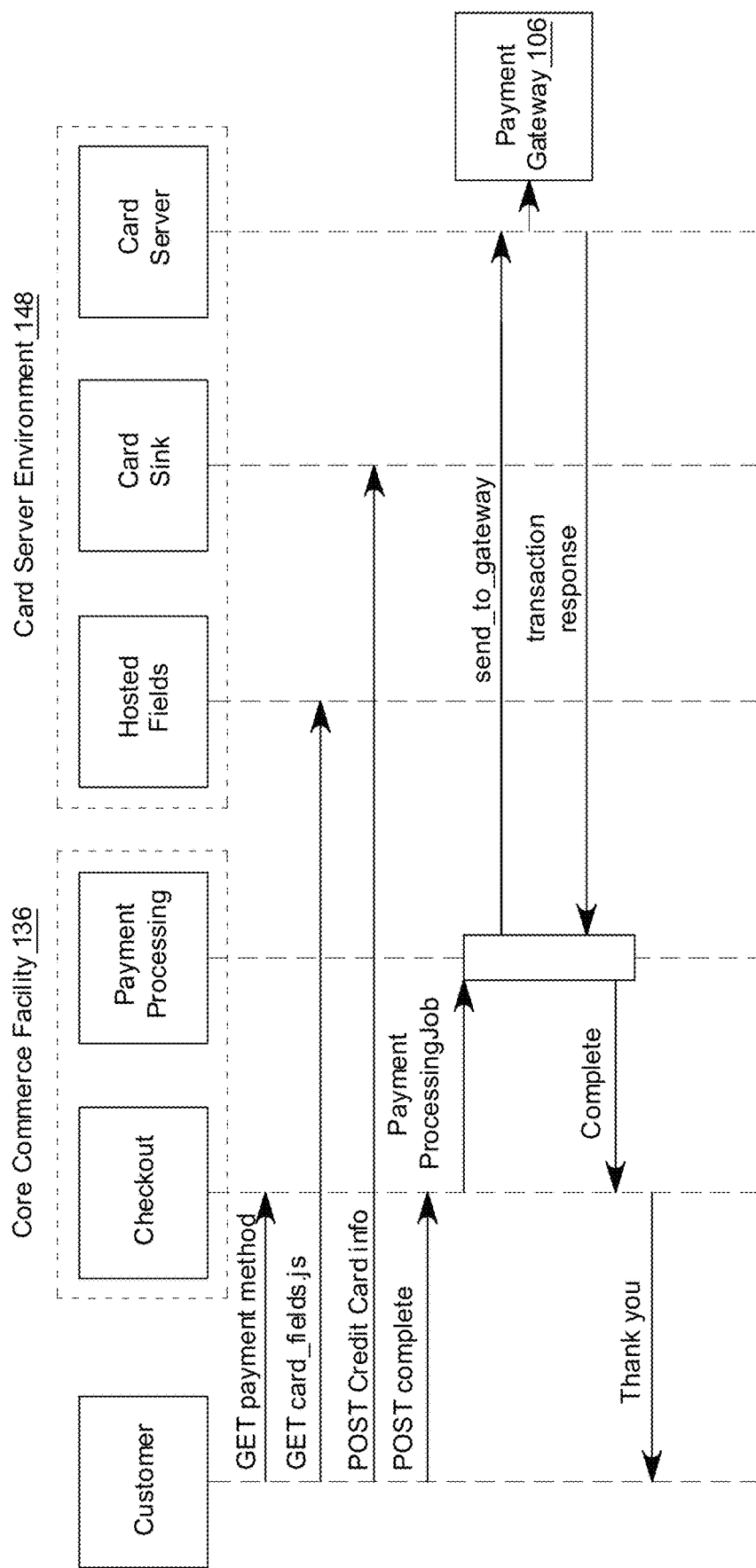
FIG. 8 shows an example data flow that may take place when a purchase is made using the e-commerce platform of FIG. 5.

FIG. 8 presents, in a non-limiting example, a simplified sequence diagram of the interactions between the core commerce facility 136 and the card server environment 148 during payment processing of a credit, prepaid, gift or other card on a Web Checkout.

In various embodiments, most of the process may be orchestrated by a payment processing job. The core commerce facility 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110 that do not rely on core commerce facility checkouts may use an order API to create orders. Once an order is created, an order confirmation notification may be sent to the customer and an order placed notification sent to the merchant via a notifications component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor). The merchant may then view and fulfill (or cancel) the order.

An order assessment component may implement a business process merchants use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In various embodiments, this business process may be implemented by a fulfillment component. The fulfillment component may group the line items of the order into a logical fulfillment unit of work based on an inventory location and fulfillment service. The merchant may assess the order, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third party, where the third-party application creates a fulfillment record. A legacy fulfillment service may trigger a custom API call from the core commerce facility 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a returns component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that were not returned and remain in the customer's hands); and the like. A return may represent a change to the contract of sale (e.g., the order), and where the e-commerce platform 100 may make the merchant aware of compliance issues with respect to legal obligations (e.g., with respect to taxes). In various embodiments, the e-commerce platform 100 may enable merchants to keep track of changes to the contract of sales over time, such as implemented through a sales model component (e.g., an append-only date-based ledger that records sale-related events that happened to an item).

Figure 9:
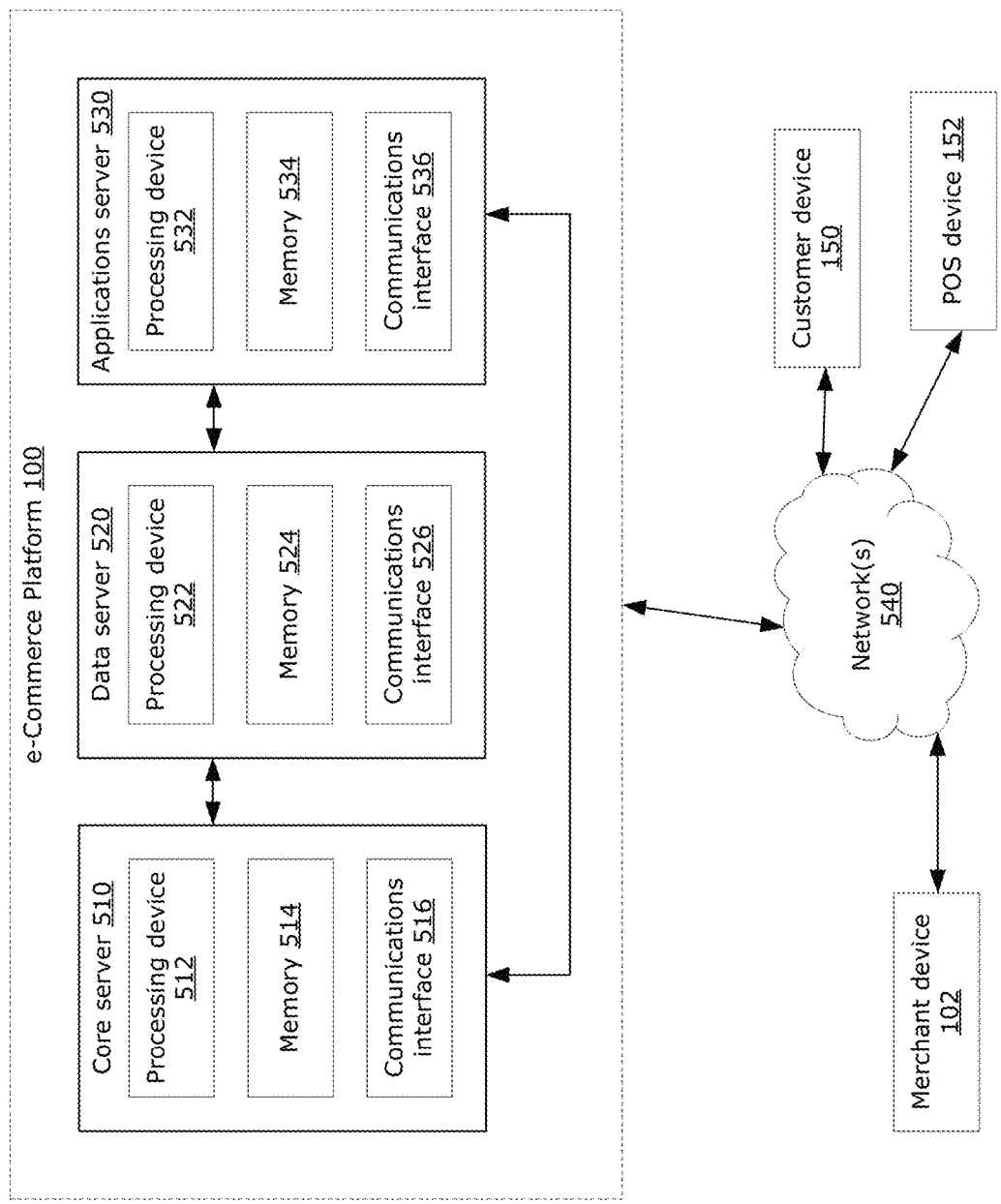
FIG. 9 is a block diagram illustrating an example implementation of the e-commerce platform of FIG. 5.

FIG. 9 is a block diagram of an example hardware configuration of the e-commerce platform 100. It should be noted that different components of the e-commerce platform 100 (e.g., the data facility 134, analytics 132, core commerce facility 136 and applications 142) may be implemented in separate hardware or software components, on a common hardware component or server or configured as a common (integrated) service or engine in the e-commerce platform 100. In the example of FIG. 9, the e-commerce platform 100 includes a core server 510, a data server 520 and an applications server 530, which are each in communication with each other (e.g., via wired connections and/or via wireless intranet connections). Each of the servers 510, 520, 530 include a respective processing device 512, 522, 532 (each of which may be, for example, a microprocessor, graphical processing unit, digital signal processor or other computational element), a respective memory 514, 524, 534 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 516, 526, 536 (each of which may include transmitter, receiver and/or transceiver for wired and/or wireless communications). The core server 510 may store instructions and perform operations relevant to core capabilities of the e-commerce platform, such as providing the administrator 114, analytics 132, core commerce facility 136, services 116 and/or financial facility 130, among others. The data server 520 may be used to implement the data facility 134, among others. The applications server 530 may store instructions and perform operations relevant to the applications 142, such as storing instructions and data for the applications 142 and for implementing application development support 128.

Merchants and customers, using respective devices 102, 150, 152 may access the e-commerce platform 100 via one or more networks 540 (e.g., wired and/or wireless networks, including a virtual private network (VPN), the Internet, and the like).

Although FIG. 9 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 514, 524, 534 may be replaced with external storage or cloud-based storage, among other possible modifications.

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

All referenced documents are hereby incorporated by reference in their entireties.

The invention claimed is:

1. A computer-implemented method comprising:
   transmitting a first web resource to be outputted by a device associated with a user account associated with an administrator of an online store;
   detecting an administrative update to configuration data or operation data associated with the online store; and
   causing an indication of a next web resource recommendation to be outputted by the device, the next web resource recommendation being determined for the user account based on the administrative update to the configuration data or operation data associated with the online store.

2. The method of claim 1, further comprising:
   prior to outputting the first web resource, receiving an initial set of configuration or operation data associated with the online store; and
   determining the first web resource to be outputted based on the initial set of configuration or operation data associated with the online store, the first web resource being related to the online store.

3. The method of claim 2, further comprising:
   determining a first list of web resources to be outputted for the user account based on the initial set of configuration or operation data associated with the online store, the first list of web resources commencing with the first web resource; and
   in response to determining the next web resource recommendation, dynamically updating the first list of web resource for the user account in real time or near real time based on the next web resource recommendation.

4. The method of claim 3, wherein dynamically updating the first list of web resource comprises at least one of:
   removing one or more web resources from the first list of web resources based on the administrative update to the configuration or operation data associated with the online store; and
   changing an order of the web resources to be outputted based on the administrative update to the configuration or operation data associated with the online store.

5. The method of claim 2, wherein the initial set of configuration or operation data associated with the online store comprises at least one of: a product listing configuration, a marketing campaign configuration, a payment configuration associated with the user account, a sales event associated with the online store, a user account setting associated with the user account, an order fulfilment event associated with the online store, a shipping event associated with the online store, or a display configuration associated of the online store.

6. The method of claim 1, wherein the administrative update to the configuration data or operation data associated with the online store comprises an update to the configuration or operation data associated with the online store, and includes at least one of: a product listing add event, a marketing campaign run event, a payment configuration add event, a sales event associated with the online store, a user account setting update associated with the user account, an order fulfilment event, a shipping event, or a modification event associated with a display configuration of the online store.

7. The method of claim 1, further comprising:
   prior to detecting the administrative update to the configuration data or operation data associated with the online store, causing a message to be displayed on the device, the message requesting a user action to be performed and including a link to perform the user action;
   wherein the administrative update to the configuration data or operation data associated with the online store comprises a confirmation that the requested user action has been performed.

8. The method of claim 7, wherein the user action comprises at least one of: adding or updating product information associated with the online store; adding or updating user account information; adding or updating payment information associated with the online store; and adding or updating the configuration or operation data associated with the online store.

9. The method of claim 1, wherein the indication of the next web resource recommendation is a link to the next web resource, and wherein the link is caused to be displayed during output of the first web resource.

10. The method of claim 9, wherein the link to the next video is automatically generated in real time or near real time based on the configuration data or operation data associated with the online store.

11. The method of claim 1, wherein the detecting and causing are carried out responsive to transmitting the first web resource.

12. The method of claim 1, wherein the detecting and causing are carried out responsive to output of the first web resource.

13. A system comprising:
a processor in communication with a storage, the processor configured to execute instructions from the storage to cause the system to:
transmit a first web resource to be outputted by a device associated with a user account associated with an administrator of an online store;
detect an administrative update to configuration data or operation data associated with the online store; and
cause an indication of a next web resource recommendation to be outputted by the device, the next web resource recommendation being determined for the user account based on the administrative update to the configuration data or operation data associated with the online store.

14. The system of claim 13, wherein the processor is configured to execute instructions from the storage to cause the system to:
prior to transmitting the first web resource, receive an initial set of configuration or operation data associated with the online store; and
determine the first web resource to be transmitted based on the initial set of configuration or operation data associated with the online store, the first web resource being related to the online store.

15. The system of claim 14, wherein the processor is configured to execute instructions from the storage to cause the system to:
determine a first list of web resources to be outputted for the user account based on the initial set of configuration or operation data associated with the online store, the first list of web resources commencing with the first web resource; and
in response to determining the next web resource recommendation, dynamically update the first list of web resources for the user account in real time or near real time based on the next web resource recommendation.

16. The system of claim 15, wherein dynamically updating the first list of web resources comprises at least one of:
removing one or more web resources from the first list of web resources based on the administrative update to the configuration or operation data associated with the online store; and
changing an order of the web resources to be outputted based on the administrative update to the configuration or operation data associated with the online store.

17. The system of claim 13, wherein the processor is configured to execute instructions from the storage to cause the system to:
prior to detecting the administrative update to the configuration data or operation data associated with the online store, cause a message to be displayed on the device, the message requesting a user action to be performed and including a link to perform the user action;
wherein the administrative update to the configuration data or operation data associated with the online store comprises a confirmation that the requested user action has been performed.

18. The system of claim 13, wherein the indication of the next web resource recommendation is a link to the next web resource, and wherein the link is caused to be displayed during output of the first web resource.

19. The system of claim 18, wherein the link to the next web resource is automatically generated in real time or near real time based on the configuration data or the operation data associated with the online store.

20. A non-transitory computer-readable medium storing instructions that, when executed by a processor of a system, cause the system to:
transmit a first web resource to be outputted by a device associated with a user account associated with an administrator of an online store; and
detect an administrative update to configuration data or operation data associated with the online store; and
cause an indication of a next web resource recommendation to be outputted by the device, the next web resource recommendation being determined for the user account based on the administrative update to the configuration data or operation data associated with the online store.

* * * * *